W. F. LANE.
Hand Screw-Clamp.

No. 214,403. Patented April 15, 1879.

Witnesses
J. E. Maynadier
C. H. Slade

Inventor:
Wilbur F. Lane.

UNITED STATES PATENT OFFICE.

WILBUR F. LANE, OF BOSTON, MASSACHUSETTS.

IMPROVEMENT IN HAND SCREW-CLAMPS.

Specification forming part of Letters Patent No. 214,403, dated April 15, 1879; application filed August 31, 1878.

*To all whom it may concern:*

Be it known that I, WILBUR F. LANE, of Boston, in the county of Suffolk and State of Massachusetts, have invented certain Improvements in Hand Screws or Clamps, of which the following is a full, clear, concise, and exact description, reference being had to the accompanying drawings, in which—

Figure 1:
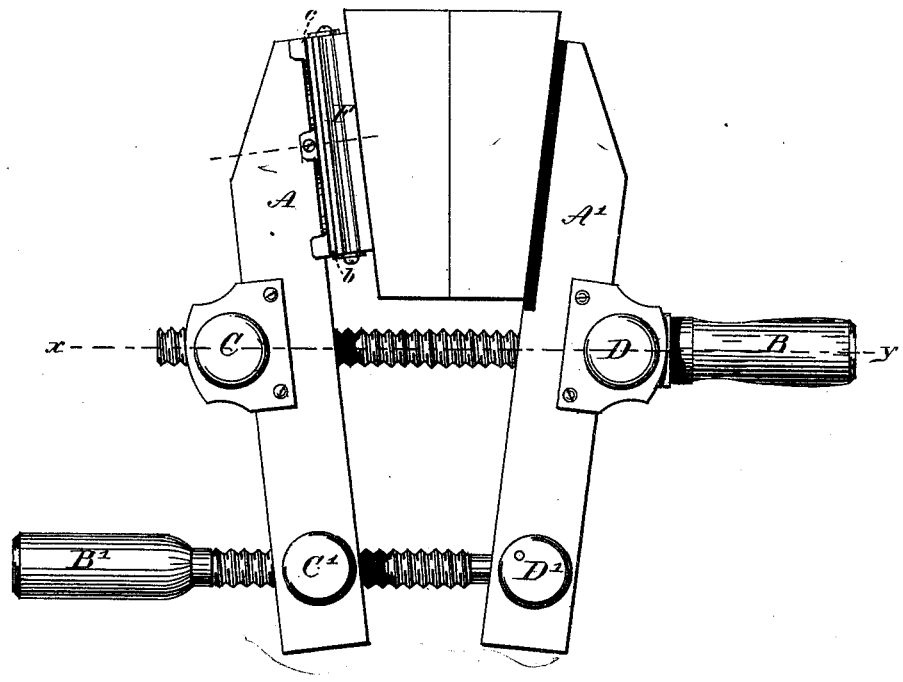
Figure 2:
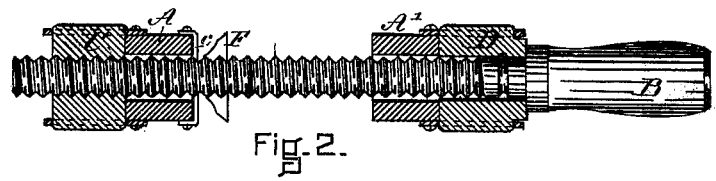

Figure 1 is a side elevation of a hand-screw (as this kind of clamp is commonly called by those who use them) embodying my invention. Fig. 2 is a section on line $x\,y$ of Fig. 1. The other figures are details and modifications.

My invention relates to the combination of the two handled screws and the clamping-jaws which they actuate; and consists in combining them by means of swiveling nuts and bearings, as more fully described below.

In the drawings, A A' are the jaws of the hand-screw; B B', two handled screws, by means of which the jaws A A' are controlled; C C', two swiveling nuts, through which the screws B B' pass; and D D', two other bearings for the screws B B'.

Each screw is provided with a handle, and is connected with one of the jaws A or A' by means of the nut C or C', and with the other jaw by means of the device D or D', which latter device may be as shown, or a ball-and-socket joint, or any other device which will permit the screw to be turned, and which will not interfere with the swiveling of the nut through which the screw passes; and my invention consists in the combination of the jaws A A' of a hand-screw by means of the two handled screws B B', the two swiveling nuts C C', and the two swiveling bearings D D', so that the jaws may be inclined to each other when requisite, and also so that the clamping end of either jaw may be thrown in advance of the other.

I have shown the nuts C C' and bearings D D' so formed that they swivel only on one axis; and this is the form I prefer for hand-screws whose jaws are made of wood; but when metal jaws are used these bearings may be spheres or balls mounted in sockets, so that they may swivel in any direction.

The swiveling bearings C C' (shown in the drawings as lying across the jaws) permit of the jaws being inclined lengthwise only to one another; and as it is often desirable that they should be inclined widthwise, I have shown combined with it a swiveling auxiliary jaw, F, formed with a cylindrical recess, $a$, along its rear face, which encompasses a cylindrical projection, $b$, attached to the face of the jaw A of the clamp.

Figure 4:
Figure 3:
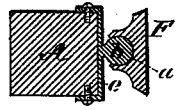
Figure 5:

The face of the jaw F may be lengthwise of the main jaw A, or across it, as shown in Fig. 4. In this figure there are two cylindrical recesses, $a\,a'$, at right angles with each other, so that the jaw F may be used with its face either lengthwise of or across the face of the jaw A, thus making a very convenient hand-screw.

What I claim as my invention is—

The improved hand-screw composed of the two jaws A A', the two screws B B', each screw having a handle, as shown, the swiveling nuts C C', and the swiveling bearings D D', all substantially as described.

WILBUR F. LANE.

Witnesses:
J. E. MAYNADIER,
C. H. SLADE.